UNITED STATES PATENT OFFICE.

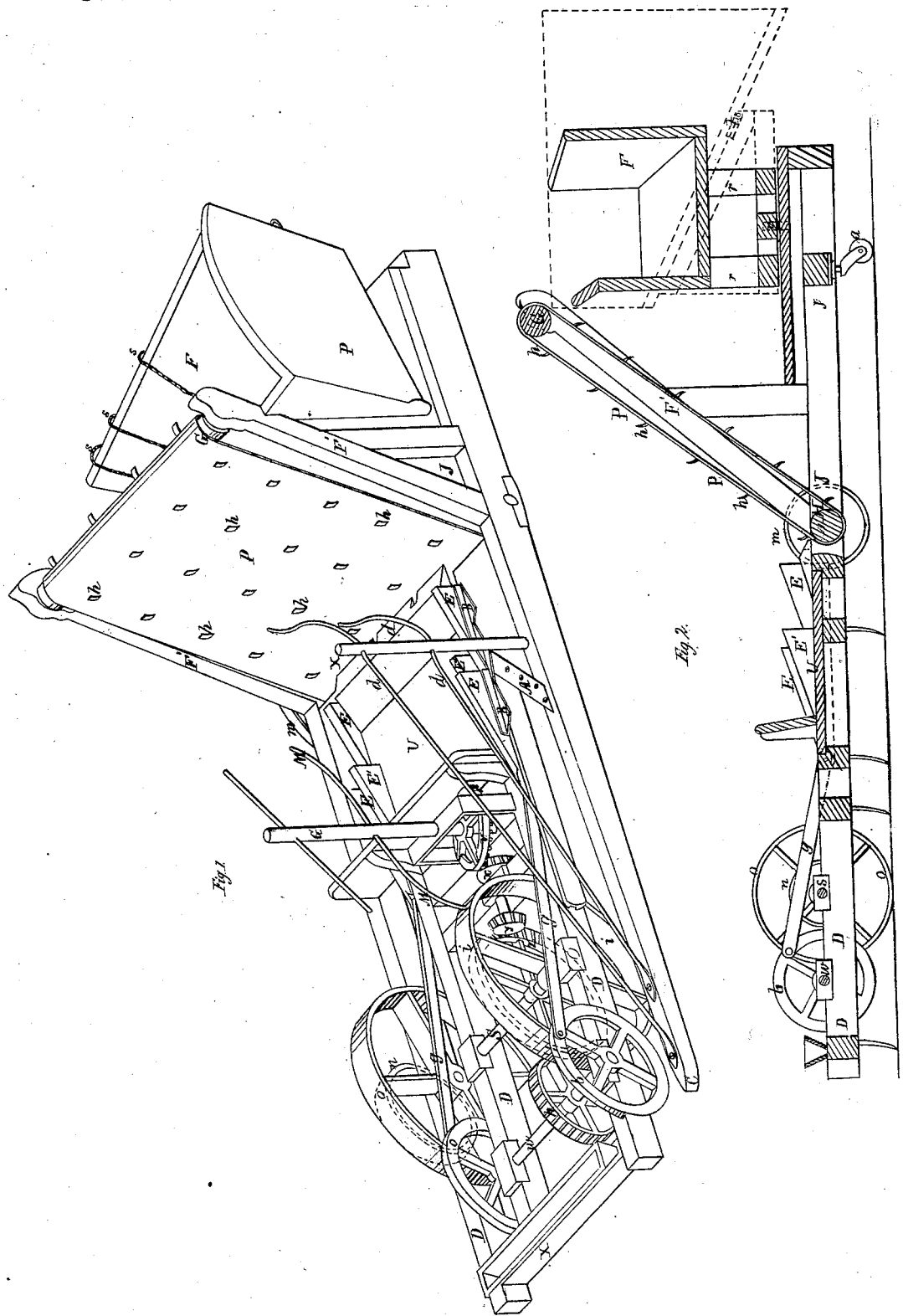
Murray & Van Doren.
Corn Harvester.
No. 22,259.    Patented Dec. 7, 1858.

BRONSON MURRAY, OF OTTAWA, AND JNO. VAN DOREN, OF FARM RIDGE, ILLINOIS.

IMPROVEMENT IN CORN-HARVESTERS.

Specification forming part of Letters Patent No. 22,259, dated December 7, 1858.

*To all whom it may concern:*

Be it known that we, BRONSON MURRAY and JOHN VAN DOREN, respectively of the towns of Ottawa and Farm Ridge, in the county of La Salle and State of Illinois, have invented a new and useful Machine for Harvesting Maize, Cane, and Hemp; and we do hereby declare that the following is a full, clear, and exact description of the construction and operation of the same, reference being had to the accompanying drawings, and to the letters of reference marked thereon making a part of this specification, in which—

Figure 1 is a perspective view, and Fig. 2 a longitudinal section.

Similar letters of reference, where they occur in the separate figures, denote like parts of the machine in both of them.

Our invention consists, first, in the inclined position of the stationary knife when combined with a device for bending over or away from said knife the stalks that are to be cut by it, or, in other words, bending over the stalks and severing them from the stubble that is to be left by cutting them from the convex side of the bend, where the fiber is strained; second, in combining with a stationary inclined cutter having a straight cutting-edge a scalloped cutter that has a longitudinal reciprocating motion; third, in combination with the cutting and directing apparatus, the shovers for pushing the grain or stalks from the place where they fall toward the delivery, whether that delivery be upon the ground or into a receiver of any kind, where they are to be gathered or bound up; fourth, the combination of an inclined conveying apparatus with a removable frame upon which it works, and with a suitable opening in rear of it, so that when the conveyer is removed the delivery shall be at said opening, but when applied shall carry the stalks or grain over and past said opening, as will be explained.

To enable others skilled in the art to make and use our invention, we will proceed to describe the same with reference to the drawings.

D represents the longitudinal pieces of the main frame, which are connected by suitable transverse pieces. This main frame is supported toward its front by a pair of wheels, $o$ $i$, that are driving as well as supporting wheels. The rear end of the main frame is supported on a caster-wheel, $a$.

Q is a long arm on one side of the machine, being nearly the entire length of the pieces D, the point $c$ of this long arm being beveled off, so as to pass into without breaking down the stalks to be cut. The main frame of the machine, when harvesting corn, passes over the ground previously harvested, and the arm or long divider Q passes outside of the row of standing corn.

On the shaft or axle S of the wheels $o$ $i$ which turns with the wheels, there is a cogged wheel, $z$, provide dwith cogs on its perimeter, as well as on the side of its rim, the latter being bevel-gearing. The bevel-gear meshes with a bevel-pinion, $y$, on a shaft, $t$. On the other end of said shaft $t$ there is a bevel-pinion, $x$, that turns a gear, $v$, on the vertical shaft G. This vertical shaft is furnished with curved gathering-arms M, which, in revolving, catch the cut stalks and carry and lay them upon the carriers, which will be presently described. The cogs on the periphery of the wheel $z$ take into and rotate a wheel, $h$, on the shaft $w$, to which it is affixed, thus rotating the shaft also. On each end of the shaft $w$ there are crank-wheels $b$ $b$ to wrist-pins, in which one of each of the ends of the pitmen $g$ are connected, the other ends of said pitmen being attached to the shovers E E, said shovers being furnished with shoulders and planes, as shown in the drawings, so that they will push the grain or stalks in one direction, but slip under them in the other direction.

The standing row of stalks, as the machine is moved over the field, is taken between the long arm Q and the rail D, between which there is a suitable opening for this purpose; but at the end of this opening there is a knife or cutter, A, which inclines in the direction in which the stalks are to pass. When the stalks arrive near this cutter A they are pressed over toward the machine by the guides $d$ $d$. This extends the fiber on the convex sides of the stalks, which enables the cutter A to more readily sever them, and when they are severed the vertical reel G, through its curved arms M, lays the stalks across the machine and on the shovers E E, whence they are pushed back toward the rear of the machine by said shovers. On that one of the shovers next the cutter A there is attached a vibrating scalloped cutter, B, which reciprocates with said shover and works across the inclined stationary knife A, so that none of the stalks can escape from being severed should they be forced away from contact with the knife A.

E' are stops, which prevent the stalks from being returned with the pushers or shovers when they move in the contrary direction from that which the cut material is to be moved. These stops E' are of course stationary, and their square ends prevent the material from moving in any other direction than that toward the delivery-point.

F' F' are supports so connected with the main frame as to be susceptible of ready removal or replacement. In these supports are hung a top and bottom roller, G H, around which passes an endless apron, P, furnished with projections $h$, which catch and support the stalks as they are carried up on said apron. This apron is inclined backward at its top, and when the cut material is carried up and over its top it may drop into a receiver, F, of the shape and form of the bundle or stack, where it may be bound, and then dumped out onto the ground in an upright position, as represented in a patent granted to John Van Doren and Bronson Murray on the 16th of March, 1858. There is a pulley, $m$, on one end of the roller H, around which and around a pulley, $n$, on the shaft S, may pass an endless belt for the purpose of giving motion to said roller, and through it to the endless apron P, by making said apron act as a belt to drive the upper roller, or by having independent belts underneath said apron for that purpose.

We have described the standards or supports F' F' as being removable. The object of this is that the material cut by the machine may be delivered onto the ground instead of into a box or former, when from its character it is desirable to so deliver it. When the material is to be dropped onto the ground the belt that drives the endless apron P is removed, the uprights or supports F' F' with the apron connected to them, are taken off, and this exposes an opening, J, through the machine or its frame large enough for the cut material to pass through and drop onto the ground. When this is done the box or receiver F is also removed from the frame, as it is not used. When the carrying-apron and box are used the inclination backward of said apron carries the material over the opening J before it falls into the box.

The cutters A B, one or both, may be sickled or plain-edged. The moving cutter B cleans the stationary one and prevents any choking.

Having thus fully described the nature and object of our invention, what we claim therein as new, and desire to secure by Letters Patent, is—

1. In combination with the inclined knife or cutter A, the curved guides or arms $d$ $d$ for bending over, and thus facilitating the cutting, substantially as described.

2. In combination with the stationary cutter A, the reciprocating cutter B, when operating together, substantially in the manner and for the purpose set forth.

3. In combination with the cutting and guiding or directing apparatus for severing and dropping the stalks, the shovers E E for moving them rearward, as described.

4. The arranging of the conveying-apron P upon removable supports F' F' and so inclining it that it will convey the stalks over or past the opening J, behind it, when used, but leave a delivery at J when removed, substantially as herein set forth.

BRONSON MURRAY.
JOHN VAN DOREN.

Witnesses:
A. G. FISHER,
WM. COGSWELL.